United States Patent
Mesa (10) Patent No.: US 8,263,231 B2
(45) Date of Patent: Sep. 11, 2012

(54) PEEL-OFF COATING COMPOSITIONS

(75) Inventor: Robert Mesa, Santa Clara, CA (US)

(73) Assignee: Cal-West Specialty Coatings, Inc., Sunnyvale, CA (US)

( * ) Notice: Subject to any disclaimer, the term of this patent is extended or adjusted under 35 U.S.C. 154(b) by 229 days.

(21) Appl. No.: 12/513,910

(22) PCT Filed: Nov. 8, 2007

(86) PCT No.: PCT/US2007/023395
§ 371 (c)(1),
(2), (4) Date: Dec. 30, 2009

(87) PCT Pub. No.: WO2008/063411
PCT Pub. Date: May 29, 2008

(65) Prior Publication Data
US 2010/0167075 A1   Jul. 1, 2010

Related U.S. Application Data

(60) Provisional application No. 60/857,847, filed on Nov. 10, 2006.

(51) Int. Cl.
*B32B 27/42* (2006.01)
*B05D 3/00* (2006.01)
*C08K 3/20* (2006.01)
*C08K 3/34* (2006.01)
*C08K 3/36* (2006.01)
*C08K 3/40* (2006.01)

(52) U.S. Cl. ........ 428/524; 156/701; 427/154; 523/122; 523/219; 524/5; 524/14; 524/35; 524/423; 524/425; 524/427; 524/430; 524/431; 524/432; 524/433; 524/445; 524/448; 524/451; 524/503; 524/500; 524/593

(58) Field of Classification Search .................. 156/344; 427/154; 428/524; 523/122, 219; 524/5, 524/14, 35, 423, 425, 427, 430, 431, 432, 524/433, 445, 448, 451, 503, 500, 593
See application file for complete search history.

(56) References Cited

U.S. PATENT DOCUMENTS

| | | | |
|---|---|---|---|
| 3,077,398 A | 2/1963 | Jones | 430/134 |
| 3,293,327 A | 12/1966 | Hechenbleikner et al. | 558/74 |

(Continued)

FOREIGN PATENT DOCUMENTS

WO   WO2008/063411   5/2008

OTHER PUBLICATIONS

International Search Report and Written Opinion dated Mar. 18, 2008 issued in WO2008/063411 (PCT/US2007/023395).

(Continued)

*Primary Examiner* — D. S. Nakarani
(74) *Attorney, Agent, or Firm* — Tom Hunter; Weaver Austin Villeneuve & Sampson LLP (57) ABSTRACT

Methods and compositions are provided for protecting exterior surfaces of automobiles and other products, or components of products, against abrasion, abrasive dust, water, acid rain, etc. The methods involve applying to a surface a protective coating composition comprising a polyvinyl butyrate emulsion and a relatively inert extender. The emulsion is dried to form a water-resistant protective coating that can be removed from the underlying surface by peeling when no longer desired.

24 Claims, 1 Drawing Sheet

U.S. PATENT DOCUMENTS

| | | | | |
|---|---|---|---|---|
| 3,513,114 | A | 5/1970 | Ilahn et al. | 523/179 |
| 3,562,197 | A | 2/1971 | Sears et al. | 524/415 |
| 3,892,577 | A | 7/1975 | Sugahara | 106/14.12 |
| 3,934,066 | A | 1/1976 | Murch | 442/221 |
| 3,969,291 | A | 7/1976 | Fukuba et al. | 523/179 |
| 4,009,137 | A | 2/1977 | Dany et al. | 523/179 |
| 4,166,743 | A | 9/1979 | Wortmann et al. | 252/606 |
| 4,247,435 | A | 1/1981 | Kasten | 523/179 |
| 5,143,949 | A | 9/1992 | Grogan et al. | 523/334 |
| 5,356,568 | A | 10/1994 | Levine | 252/606 |
| 6,447,979 | B1 | 9/2002 | Hattori et al. | 430/270.1 |
| 6,849,328 | B1 * | 2/2005 | Medwick et al. | 428/341 |
| 6,930,138 | B2 | 8/2005 | Schell et al. | 524/145 |
| 6,964,989 | B1 | 11/2005 | Fang et al. | 524/145 |
| 2004/0157078 | A1 | 8/2004 | Yoshida | 428/524 |
| 2005/0009966 | A1 | 1/2005 | Rowen | 524/115 |
| 2009/0044897 | A1 * | 2/2009 | Thomsen et al. | 156/150 |

OTHER PUBLICATIONS

International Preliminary Report on Patentability dated Mar. 18, 2008 issued in WO2008/063411 (PCT/US2007/023395).

European Search Report dated Nov. 3, 2010 issued in EP07853092.0.

* cited by examiner

PEEL-OFF COATING COMPOSITIONS

CROSS-REFERENCE TO RELATED APPLICATIONS

This application is a 371 National Phase of PCT/US2007/023395, filed on Nov. 8, 2007, which claims benefit of and priority to U.S. Ser. No. 60/857,847, filed on Nov. 10, 2006, both of which are incorporated herein by reference in their entirety for all purposes.

STATEMENT AS TO RIGHTS TO INVENTIONS MADE UNDER FEDERALLY SPONSORED RESEARCH AND DEVELOPMENT

[Not Applicable]

FIELD OF THE INVENTION

This invention relates to the field of protective coatings. In particular embodiments, this invention relates to peelable protective coatings comprising a polyvinyl butyral and an extender.

BACKGROUND OF THE INVENTION

The surface paint finishes of new vehicles and other articles of manufacture are subject to a variety of injuries both during the assembly process, during transportation from the assembly plant to retail locations, during installation, repair, maintenance, and the like. Various finishes on articles of manufacture are especially prone to damage during manufacture or in the first month following manufacture because the paint or plastic surfaces have not had sufficient time to cure. Typical sources of damage include, but are not limited to, impact, scratches, marring, dirt, oil, abrasive particles that rise from a rail bed or a highway, salt that occurs in the air near shore locations (e.g., cargo loading areas), paint overspray (e.g., in autobody shops), sandstorms, chemical exposure, ultraviolet light exposure, and the like. Rail dust and salt damage are especially difficult problems for car manufacturers as many cars and other vehicles are transported from assembly plants or dockyards to retail markets by rail of by sea. The damage inflicted on the vehicles' surface finish during transit can be quite severe, even requiring shipment back to the assembly plant for complete repainting.

In addition to vehicles, other products are also subjected to abrasive and deleterious conditions during transit, and during fabrication and assembly into other products. For instance, storm windows and other glass products must be specially protected to avoid scratching and marring during road and rail transit. Deck cargo is also susceptible to surface damage caused by salt water and other factors. Similarly, many products must be protected during fabrication or assembly by downstream manufacturers. For example, plastic laminates such as FORMICA®, composites (e.g., fiberglass, Kevlar, and the like), and other materials with high-gloss finishes such as bathroom fixtures and chrome plated or brass surfaces must be protected not only during shipping, but during installation or assembly into other products.

Various approaches have been utilized to protect the exposed surfaces of vehicles, vehicle components, and other products during manufacture and transportation. The simplest approach, physical protection with solid coatings (e.g., covering the vehicle or component with plastic or canvas) has various levels of effectiveness and is labor intensive and often prohibitively expensive for mass shipments. Plastic sheeting, for example, is often as much as ten times more expensive to use than chemical coating solutions due to higher material costs and the amount of labor needed to properly apply the sheetings. In addition it is difficult, time consuming and sometimes virtually impossible to apply solid sheet coatings to complex or convoluted surfaces.

Solution-type protective compositions are known, but have not found widespread use because of the damage that may possibly occur to the underlying or adjacent surfaces. These compositions are often difficult to remove from certain surfaces (e.g., underlying plastics). Also, traditional chemical methods suffer from high cost and the health and environmental dangers posed by solvent-based solutions and coatings.

Aqueous emulsion type coatings are also easily applied and eliminate the problems associated with various organic solvent systems. The most widely used are polyvinyl acetate emulsions or acrylic resin emulsions. These emulsions, however, are defective with respect to adhesion, flexibility and/or removability over a range of temperatures, resistance to water, and stability in storage, and low drying velocity after application. In addition many coatings tend to become very difficult to remove particularly after exposure to sunlight (UV radiation) or elevated temperature.

The term "consisting essentially of" when used with reference to a coating composition as described indicates that the invention includes the listed ingredients and is open to unlisted ingredients that do not materially affect the basic and novel properties of the invention. Thus additional ingredients are permissible that do not substantially diminish the protective ability and/or the peelability of the composition.

SUMMARY OF THE INVENTION

The present invention relates to surface protective coatings and more specifically to peel-off (peelable) coatings effective for protecting exposed surfaces of various products and components. In various embodiments the protective coating composition provided herein comprise one or more polyvinyl butyral film formers. It was a surprising discovery that the butyral coatings can be extended using one or more inert fillers/extenders while still preserving adequate strength, toughness, and flexibility to facilitate removal from an underlying surface simply by mechanical peeling. This permits the protective coating compositions to be manufactured at substantially lower cost.

Thus, in certain embodiments, this invention provides a composition for the formation of a peelable protective coating on a surface. The composition typically comprises an aqueous mixture or solution comprising a polyvinyl butyral film former; and an extender. In a variety of embodiments, the mixture or solution does not include a polyurethane. In certain embodiments the extender includes, but is not limited to one or more components selected from the group consisting of a silicate, a carbonate, a sulfate, a halide salt, a mineral, a mineral oxide, a clay, talc, a polymer fiber, glass, glass spheres, plastic spheres, and a polyvinyl alcohol. In certain embodiments the extender includes, but is not limited to one or more components selected from the group consisting of barium sulfate, calcium magnesium silicate, mica, calcium carbonate, and diatomaceous earth. In certain embodiments the extender excludes one or more components selected from the group consisting of a silica, a cellulose, a wood flour, and a clay.

The composition can, optionally, further comprise a fire/flame retardant. In certain embodiments the fire/flame retardant comprises a catalyst/initiator; a carbonific, a cement, a blowing agent, and a heat-resistant inorganic material. In certain embodiments the flame retardant comprises TSWB® (Avtec Industries).

In various embodiments the aqueous mixture or solution further comprises a surfactant and/or a thickener and/or a plasticizer, and/or a colorant, and/or a biocide. In certain embodiments the butyral film former percent solids ranges from about 5% to about 50% wt/wt of said aqueous mixture of solution. In various embodiments the extender comprises from about 0.1% to about 70% w/wt of said aqueous mixture or solution. In various embodiments, when present, the surfactant is present at up to about 1%, 2%, 3% or even about 5% of the aqueous mixture or solution. In certain embodiments the surfactant comprises a siloxane.

In various embodiments, when present, the plasticizer comprises up to about 5%, about 10%, about 15%, about 20%, or even about 25% or 30% of the aqueous mixture or solution. In certain embodiments the polyvinyl butyral film former percent solids ranges from about 15% to about 40% wt/wt of said aqueous mixture or solution; and the extender comprises from about 15% to about 30% of said aqueous mixture or solution. In such formulations, a thickener and/or surfactant, and/or biocide, and/or colorant can be present.

Also provided are methods of protecting a surface. The methods typically involve applying to the surface a liquid coating composition as described herein and drying said coating composition to form, on the surface, a substantially continuous peelable protective film. In certain embodiments the applying is by a means selected from the group consisting of a sprayer, a brush, a roller, dipping, extruding, and a doctor bar. In certain embodiments the applying comprises air drying the composition at room temperature. The method can optionally further comprises removing the composition from the surface. In certain embodiments the removing comprises peeling the composition from the surface. In certain embodiments the removing comprises a method selected from the group consisting of a power wash, an air blast, and a steam blast. In certain embodiments surface is a surface of an article of manufacture selected from the group consisting of a motor vehicle, a motor vehicle component, a bathroom fixture, a plumbing fixture, a tool, a machine, a laminated countertop, a table top, a window assembly, a door assembly, a stove, a refrigerator, a microwave oven, an aluminum tank, a wheel, furniture, a plated or chromed part, a bumper, an instrument panel, a part of an oil or gas rig, a surface of an aircraft, a marine vessel, a surface of a train, a furniture surface, a musical instrument, a pipe, a paintbooth surface, a part of a windmill, a shelf, a composite, a floor, a cargo container, electronic equipment casing, a surface of a bridge, construction equipment, and a cabinet.

In certain embodiments this invention comprises an article of manufacture comprising a surface coated with a protective coating composition described herein where the coating composition is dried to for a dry peelable protective film on the article of manufacture.

DEFINITIONS

A peelable film is a film that can be removed from an underlying surface by mechanical peeling.

When a film forming composition is referred to as a "fluid, before drying" this refers to the composition as formulated without substantial subsequent evaporation and/or drying.

A "polyvinyl butyral resin refers" to a resin typically made from a polyvinyl alcohol by reaction with butanal.

DETAILED DESCRIPTION

The present invention relates to surface protective coatings and more specifically to peel-off (peelable) coatings effective for protecting exposed surfaces of various products and components. In particular, the coatings are suitable for protection of a variety of substrates including, but not limited to vehicles and vehicle components including automotive paints, metals, plastics, glass, asphalt, concrete, porcelain, and ceramics, oil and gas rigs, windmills, gas lines, pipes, ships, boats, aircraft, trucks, buses, trains, bicycles (e.g., trail bikes), construction and farm equipment, composites, and the like.

In various embodiments the protective coating composition provided herein comprise one or more polyvinyl butyral film formers. It was a surprising discovery that the butyral coatings can be extended using one or more inert fillers/extenders while still preserving adequate strength, toughness, and flexibility to facilitate removal from an underlying surface simply by mechanical peeling. This permits the protective coating compositions to be manufactured at substantially lower cost.

In this regard, it was discovered that the resulting coating composition including one or more extenders demonstrated the strength and toughness needed to be peelable from typically hard to release surfaces including, but not limited to acrylic polycarbonate, and a wide variety of "plastics" previously found to have somewhat unpredictable release characteristics. Moreover, the protective films produced by the coating compositions described herein are surprisingly flexible at a wide range of ambient temperatures and under various weather conditions, thus allowing for a film that is not easily broken during the removal process. These properties provide a more commercially attractive product having wider range of applications not believed to be obtainable using previous peelable technologies.

Thus, in many embodiments, the protective coating compositions described herein further include one or more extenders. In various embodiments the coating compositions can optionally further include various components including, but not limited to one or more thickeners, and/or plasticizers, and/or surfactants, and/or colorants, and/or biocides.

Film Former.

The protective coating compositions of the present invention typically comprise one or more butyral (polyvinyl butyral) film formers. The film formers are typically provided as a dispersion or emulsion with aqueous dispersions or emulsions or water-compatible dispersions or emulsions being preferred. The film former can comprise a single polyvinyl butyral or a mixture of polyvinyl butyrals typically having a molecular weight in a range from about 3000 to about 800,000, preferably from about 4,000 to about 700,000, and most preferably from about 5,000 or about 10,000 to about 400,000 or about 500,000. Polyvinyl butyral resin emulsions/dispersions are commercially available from a number of suppliers (e.g., BUTVAR™ aqueous dispersion RPI, aqueous dispersion 261, aqueous dispersion 3120, aqueous dispersion FP, aqueous dispersion BR, from Solutia, Inc., and the like).

A 50% solids butyral film former typically comprises from about 10% to about 90% (wt percent), preferably from about 20% to about 80%, more preferably from about 30% to about 70%, and most preferably from about 40% to about 60% of the protective coating composition before drying. This corresponds to a percent solids of the coating composition before drying of about 5% to about 45% or 50%, preferably from about 10% to about 40%, more preferably from about 15% to about 35%, and most preferably from about 20% to about 30% (wt percent).

In certain embodiments the coating composition can be formulated with other film formers in addition to the butyral film former. Additional film formers suitable for use in this invention include, but are not limited to vinyl-acrylic copolymers, ethylene vinyl acetates, vinyl chloride copolymers, acrylic latex (e.g., 1324, B.F. Goodrich), acrylic copolymer emulsions (e.g., HYCAR™ 2679, Noveon), styrene acrylic copolymers (e.g., CARBOSET™ 958, Noveon), polyvinyl acetate emulsions (e.g., VINAC® XX series emulsions from Air Products), and the like. When used, the additional film formers can be present at up to about 90 percent, by weight of the coating, however, in various embodiment, they are present at less than about 50 percent, more preferably less than about 20 percent and most preferably less than about 10 percent, by weight of the protective coating composition before drying.
Extender.

It was a surprising discovery that one or more extenders can be incorporated into the butyral films described herein at relatively high concentration without adversely altering the strength, toughness, or protective capabilities of the protective film. Various suitable extenders include, but are not limited to silicates, carbonates, nitrates, borates, sulfates, halides (e.g., halide salts, metal and non-metal halides, etc.), minerals including mineral oxides, clays, talc, polymer fibers, polyvinyl alcohols, cellulose and cellulose derivatives, diatomaceous earth, chitin, a glass, a clay, a polymer fiber, and a polyvinyl alcohol.

In certain embodiments the minerals include, but are not limited to, a quartz, a mica, a feldspar, a garnet, an amphibole, a pyroxene, and the like.

In certain embodiments, the sulfates include, but are not limited to, gypsum, anhydrite, bassanite barite, celestite, chromate, molybdate, selenate, sulfite, tellurate, tungstate, and the like.

In certain embodiments the carbonates include, but are not limited to calcium carbonate (e.g., including but not limited to calcite and aragonite), magnesium/calcium carbonate (including, but not limited to dolomite), iron carbonate, and the like.

Suitable silicates include, but are not limited to hydrous calcium magnesium silicate, magnesium silicate, sodium silicate, aluminum silicate, and the like.

In certain embodiments, the halides include but are not limited to, sodium chloride, potassium chloride, ammonium chloride, and the like.

Suitable cellulosic materials include, but are not limited to cellulose, methylcellulose, hydroxyethylcellulose, hydroxypropylcellulose, carboxymethylcellulose, cellulose triacetate, cellulose acetate, various dextrins, and the like.

In certain embodiments the extenders can comprise various glass, mineral, crystalline, or plastic, reflective or non-reflective spheres or microspheres.

The extender(s) when present, comprise up to about 70% (wt percent) of the protective coating composition before drying. In various embodiments the extenders, when present, range from about 2%, 3% or 5% to about 40%, 50%, 60% or 70% (wt percent) of the coating composition. In certain embodiments the extenders, when present, range from about 5% to about 40%, preferably from about 10%, 15%, or 20% to about 30% (wt percent) of the coating composition before drying.
Surfactant.

In various embodiments, the protective coating compositions of the present invention optionally include one or more surfactants. Without being bound to a particular theory, the surfactants can improve wetting of the underlying surface when the coating composition is first applied and/or can enhance peelability of dried film. Suitable surfactants include ionic surfactants (cationic or anionic), nonionic surfactants, amphoteric surfactants, and the like.

Examples of nonionic surfactants include various ethoxylated alcohols (alcohol ethoxylates). Such ethoxylated alcohols, include but are not limited to monoethers of polyethylene glycols and long chain alkanols in which the alkanol has 10 to 16 carbon atoms and the polyethylene glycol has 5 to 15 oxyethylene units. Such monoethers of polyethylene glycol are generally made by reacting the alkanol with ethylene oxide. Such nonionic surfactants are well known to those of skill in the art and are commercially available. For example, commercially available TOMADOL® 25-7, a nonionic surfactant, is an adduct of 7 mols of ethylene oxide and 1 mol of a mixture of alkanols of 12 to 15 carbon atoms. Other related nonionic surfactants include TOMADOL® 25-3, NEODOL® 4511, NEODOL®2503, ALFONIC® 1618-65, PLURAFAC® B26, and the like. in certain embodiments the alcohol ethoxylate comprises RHODASURF® TDA-8.5 available from Rhodia in Cranbury, N.J. (USA).

Ionic surfactants include anionic and cationic surfactants. Suitable anionic surfactants are well known to those of skill in the art and include, but are not limited to various carboxylates, N-acylsarcosinates, acylated protein hydrolysates including various sulfonates, ethoxylated and/or sulfonated alkylphenols, and the like. Cationic surfactants are also well known to those of skill in the art and include, but are not limited to aliphatic mono-, di- and polyamines derived from fatty and rosin acids, quaternary ammonium salts, and the like.

Suitable amphoteric surfactants include, but are not limited to, the alkylbetaines, alkyldimethylamines, amphoteric imidazolinium derivatives, and the like.

In certain embodiments, the surfactant includes two nonionic surfactants, one a low hydrophile-lipophile balance (HLB) surfactant and the other a high (HLB) surfactant. (The hydrophile-lipophile balance is an expression of the relative simultaneous attraction of surfactant for water and for oil [or for the two phases of the emulsion system being considered]). The high HLB surfactant then acts as an emulsifier effectively solubilizing the HLB surfactant. In a certain embodiments, nonionic low HLB and high HLB surfactants are combined with a high foaming ionic surfactant which provides foam height and helps lift abraded particles, dirt and oil up away from the underlying surface.

As used herein, a low HLB surfactant is one which has an HLB number ranging from about 3 to about 8, while a high HLB surfactant is one which has an HLB number ranging from about 9 to about 2.

In certain embodiments, the surfactant comprises TOMADOL® 25-3 (Tomah, Inc.) as the low HLB surfactant (HLB number about 7.8) and TOMADOL® 25-7 (Tomah, Inc.) as the high HLB surfactant (HLB number about 12.3) and RHODAPLEX® CO 436, sodium dodecyl sulfate, dioctylsodiumsulfosuccinate (e.g., ACROSOL® OT-75), STEOL® CA-460, or STEOL® CS-460 as the high foaming surfactant. Other suitable high HLB, low HLB and high foaming surfactants will be known to those of skill in the art.

Also suitable is TRITON® X-100 $(C_{14}H_{22}O(C_2H_4O)_n$ where the average number of ethylene oxide units per molecule is around 9 or 10) and surfactants having fluorinated alkyl chains such as "FLUORAD®" products sold by Minnesota Mining and Manufacturing (St. Paul, Minn., U.S.A.) and "ZONYL®" products sold by DuPont Company (Wilmington, Del., U.S.A.) are also suitable. In addition, many embodiments can include polyethoxy adducts or modified (poly)ethoxylates such as TRITON® DF-12 and DF-16 sold by Union Carbide (Danbury, Conn., U.S.A.). Other surfactants include nonylphenoxypolyethanol (such as IGEPAL CO-660 made by GAF), polyoxyalkylene glycol (such as MACOL® 18 and 19 made by Mazer Chemicals), acetylenic diol-based surfactants (such as SURFYNOL® 104 made by Air Products), and the like.

In various embodiments the surfactant(s) comprise one or more silicone surfactants. Such surfactants include, but are not limited to silicone polyoxyalkylene copolymers, organo-silicone-polyether copolymer surfactants, and the like. Such surfactants include, but are not limited to various dimethicone surfactants such as PEG-11 methyl ether dimethicone (e.g., GRANSURF® 71), PEG-10 dimethicone (e.g., GRANSURF® 77), stearoxymethicone/dimethicone copolymer (e.g., GRANSIL® ST-9), and the like. In certain embodiments, preferred siloxane-based surfactants include BYK® surfactants (e.g., BYK-345, BYK346, BYK-347, BYK-348, and the like) available from BYK Chemie GmbH (West Germany). Other silicone surfactants can be identified for example in Hill (1999) *Silicon Surfactants*, Marcel Decker, N.Y.

In certain preferred embodiments, the surfactant comprises a linear fatty alchol ether sulfate (e.g., $CH_3(CH_2)_{10}CH_2(OCH_2CH_2)_3OSO_3NH_4$ available as STEOL® CA-460 from Stepan).

In various embodiments, the total surfactant comprises about 0.01% to about to about 6.0%, more preferably about 0.01 to about 3.0% and most preferably about 0.1% to about 2.0% of the total composition before drying. If present, the high and low HLB surfactants are preferably present in equal concentration with the concentration of each ranging from about 0.01% to about 2%, more preferably about 0.01% to about 1% and most preferably about 0.01% to about 0.5% of the total composition. If present, the high foaming surfactant is preferably present in a concentration equivalent to the combined high and low HLB surfactants, with a concentration preferably ranging from about 0.01% to about 2%, more preferably from about 0.01% to about 1.5%, and most preferably from about 0.01% to about 1% of the total composition.

Thickener.

In various embodiments, the protective coating compositions of the present invention optionally include one or more thickeners.

Essentially any thickener, preferably water soluble or water-compatible thickeners can act as a suitable suspension agent. Certain preferred thickeners show little or no water sensitivity.

Thickening agents are well known to those of skill in the art and include, but are not limited to, natural product thickeners such as cellulose, cellulose derivatives (e.g., hydroxycellulose, methylcellulose, hydroxyethylcellulose, hydroxymethylcellulose, etc.), starch or modified starches, dextrins, and the like Suitable thickeners are well known to those of skill in the art and include, but are not limited to Montmorillonite, EZ-1, BFG, Acrysol™ (e.g ACRYSOL® RM 825, ACRYSOL® RM-W8, ACRYSOL® RM-W12, and the like), RHEOLATE® (e.g., RHEOLATE® 450, Rheox Co.), OPTIFLO® (e.g., OPTIFLO® TVS, OPTIFLO® H600, from Sud-Chemie), and the like. Certain desirable thickeners include, but are not limited to various polymer or polymer emulsion thickeners such as silicone based thickeners, acrylic emulsion thickeners (e.g., CARBOPOL® EP1, CARBOPOL®1324, etc.) and acrylic copolymers (e.g., CARBOPOL® EZ-1, CARBOPOL® EZ-3) and the like.

In various embodiments the thickener can be present at up to about 20%, by weight of the composition before drying, but it is preferably present at up to about 10% or 5%, more preferably at up to about 3%, and most preferably at up to about 2%, by weight of the composition.

Plasticizer.

In certain embodiments, the coating compositions described herein optionally include one or more plasticizers. The plasticizers can be used to can be used to impart flexibility and/or toughness to the protective film, and/or to prevent cracking, and/or to facilitate peeling of the film from an underlying surface.

Numerous plasticizers can be used in the coating compositions described herein. Such plasticizers include, but are not limited to phthalates, adipates, sebacate esters, and more particularly: glyceryl tri(acetoxystearate), epoxidized soybean oil, epoxidized linseed oil, n-butyl benzene sulfoamide, epoxidized soya oil, polyester glutarate, triethylene glycol caprate/caprylate, long chain alkyl ether, dialkyl diether glutarate, monomeric, polymer, and epoxy plasticizers, polyester based on adipic acid, hydrogenated dimer acid, distilled dimer acid, polymerized fatty acid trimer, ethyl ester of hydrolyzed collagen, isostearic acid and sorbian oleate and cocoyl hydrolyzed keratin, PPG-12-PEG-65 lanolin oil, dialkyl adipate (e.g., SANTICIZER® 97), dihexyl adipate (e.g., SANTICIZER® 367), alkylaryl phosphate, alkyl diaryl phosphate, modified triaryl phosphate, triaryl phosphate, butyl benzyl phthalate (e.g., SANTICIZER® 160), octyl benzyl phthalate, alkyl benzyl phthalate, dibutoxy ethoxy ethyl adipate, 2-ethylhexyldiphenyl phosphate, dibutoxy ethoxy ethyl formal, diisopropyl adipate, diisopropyl sebacate, isodecyl oleate, neopentyl glycol dicaprate, neopenty glycol diotanoate, isohexyl neopentanoate, ethoxylated lanolins, polyoxyethylene cholesterol, propoxylated (2 moles) lanolin alcohols, propoxylated lanoline alchols, acetylated polyoxyethylene derivatives of lanoline, dimethylpolysiloxane, glycerine, polyethylene glycol, dibutyl phthalate 2,2,4-trimethyl-1,3-pentanediol monoisobutyrate, and di-isononyl phthalate, (DINP), and the like.

Ricinoleates, including, but not limited to ricinoleate esters are also well suited to plasticize butyral resins. Such ricinoleates include, but are not limited to glycerol tri-ricinoleate (castor oil, raw or process), methyl ricinoleate (e.g FLEXRICIN® P1), butyl ricinoleate (FLEXRICIN® P3, methyl acetyl ricinoleate (FLEXRICIN® P-4), butyl acetyl ricinoleate (FLEXRICIN® P-6), glycerol tri(acetyl ricinoleate) (e.g., FLEXRICIN® P-8), propylene glycol mono-ricinoleate (e.g., FLEXRICIN® 9), glycerol mono-ricinoleate (e.g., FLEXRICIN® 13), propylene glycol mono-ricinoleate (e.g., FLEXRICIN® 9), glycerol mono-ricinoleate (e.g., FLEXRICIN® 13), ethylene glycol mono-ricinoleate (e.g., FLEXRICIN® 15), propylene glycol monohydroxystearate (e.g., Paricin® 9), glycerol monohydroxystearate (e.g., Paricin® 13), and the like. Saturation of the double bond in ricinoleate esters yields hydroxy and acetoxystearates that can provide improved stability to oxidation and resistance to ultraviolet light.

Other suitable plasticizers include, but are not limited to linseed oil, a citrate plasticizers (e.g., tributyl citrate), phosphate plasticizers (e.g., 2-Ethylhexyl Diphenyl Phosphate (Santicizer 141), Isodecyl Diphenyl Phosphate (SANTICIZER® 148), Tert-Butylphenyl Diphenyl Phosphate (SANTICIZER® 154), triaryl phosphate ester blend (SANTI- CIZER® 143), tricresyl phosphate (TCP), triphenyl phosphate (TPP), and the like), phthalates (e.g., alkyl benzyl phthalate (e.g SANTICIZER® 261, 278,) butyl benzyl phthalate (e.g SANTICIZER® 160), dibutyl phthalate (DBP), dialkyl phthalate, dioctyl phthalate (DOP), and the like), polyethanolglycolether (e.g., PYCAL® 94), polyester (e.g., PARAPLEX® RGA-8), rosin derivatives (e.g., HERCO-LYN®), sebacate (e.g., dibutyl sebacate), sulfonamide (e.g., KETJENFLEX® 8 (n-Ethyl Toluenesulfonamide), KETJENFLEX® 9S (toluenesulfonamide)), and the like.

Plasticizers especially useful with the polyvinyl butyral resins are differentiated primarily by the molecular weights. One or more plasticizers of different molecular weight can be used in the formula depending upon the desired properties of the coating. In various embodiments the amount of plasticizer can range from about 0.1 percent to about 20 percent by weight, more preferably from about 0.5 percent to about 10.0 percent by weight, and more preferably from about 1.0 to about 5.0 percent by weight of the total weight percent of the composition.

Certain plasticizers include, but are not limited to, TEXANOL® (2,2,4-trimethyl-1,3-pentanediol monoisobutyrate propionic acid, 2-methyl-, monoester with 2,2,4-trimethyl-1,3-pentanediol isobutyric acid ester with 2,2,4-trimethyl-1,3-pentanediol, $C_{12}H_{24}O_3$) available from Eastman Co., and PARAPLEX® (e.g., PARAPLEX® WP-1) available from Rohm and Haas. The plasticizer, if present is typically present at a concentration ranging from about 0.01 to about 10%, preferably from about 0.1% to about 5%, more preferably from about 0.2% to about 4%, and most preferably from about 1% or 2% to about 3% or 4%, by weight, of the coating composition before drying. In applications where the coating composition or protective film formed therefrom is subject to high temperature, PARAPLEX® can be used in place of TEXANOL® to reduce odors.

The plasticizers are typically dispersed in water before being added to the Butvar dispersion resin. One typical procedure involves mixing the ingredients thoroughly, e.g., by dispersing them in 48 parts of water containing 0.4 parts of sodium hydroxide with good agitation. The finished plasticized dispersion is typically should be an oil-in-water type and is generally homogenized before being added to the Butvar dispersion resin. The plasticized dispersion is typically allowed to stand overnight before use to ensure uniform penetration of the plasticizer into the polyvinyl butyral particles.
Other Components.

In various embodiments the protective coating compositions described herein can optionally additionally include a fire/flame retardant. The incorporation of a fire retardant greatly increases the safety and versatility of the peelable film. In particular, the incorporation of a flame retardant significantly reduces the flammability of the coating when the coating is a free-film not adhered to a substrate. Without the fire retardant free films produced by peelable polymeric emulsions can be extremely flammable and relatively dangerous in a number of commercial environments.

In many applications, the peelable film is pulled away from part of a substrate to allow work on the exposed portion. Welding would be an example of this. In this example, the welding sparks/spatter could ignite the free film that was pulled away from the substrate. Incorporation of flame retardants as described herein renders the free film substantially inflammable thereby eliminating this danger.

It was a surprising discovery that the polyvinyl butyrate, in combination with flame retardants as described herein, can be used as removable (peelable) coatings.

Any of a variety of flame retardant agents can be used in the formulations of this invention. In various embodiments the flame retardant is an intumescent fire retardant smoke suppressing polymer additive. Such additives include, but are not limited to bicyclic phosphites, phosphonates, thiophosphates, and selenophosphates (see, e.g., U.S. Pat. No. 3,293,327), fire-retardant coating compositions containing carbonifics, film-forming binders and phosphorous materials (see, e.g., U.S. Pat. Nos. 3,562,197; 3,513,114; 4,009,137; 4,166,743 and 4,247,435, which are incorporated herein by reference), amide polyphosphate condensates (see, e.g., U.S. Pat. No. 3,969,291 which is incorporated herein by reference), a solvent-based heat-resistant and fire-retardant coating containing carbonifics, film-forming binders, phosphorous materials smoke suppressed flame retardant thermoset compositions (see, e.g., U.S. Pat. No. 5,356,568, which is incorporated herein by reference) and the like.

In certain embodiments the flame retardant material comprises a powder that can be mixed with resins includes a carbonific material, a heat activated blowing agent, a heat activated halogen material, a phosphate material, and an inorganic material (e.g., a heat-resistant inorganic material) as described in U.S. Pat. No. 6,930,138 which is incorporated by reference herein. Such inorganic materials include, but are not limited to silica, calcium aluminate, various minerals, ceramics, and the like.

As described in the U.S. Pat. No. 6,930,138 patent, which is incorporated herein by reference in its entirety for all purposes, certain flame retardants comprise a combination of ingredients as shown in Table 1.

TABLE 1

Illustrative flame retardant composition, e.g., as described in U.S. Pat. No. 6,930,138.

| Ingredient | Wgt. % Range | Function |
| --- | --- | --- |
| Dipentaerythritol | 10.0-12.0 | carbonific |
| Melamine | 15.5-17.5 | blowing agent |
| Chlorinated Paraffin—40% | 4.0-6.0 | halogen material |
| Chlorinated Paraffin—70% | 8.0-11.0 | halogen material |
| Ammonium polyphosphat | 27.5-29.9 | phosphorous |
| Tris(betachloroethyl)phosphate | 2.5-4.5 | phosphorous |
| Silica flour (120 mesh | 8.5-10.5 | inorganic |
| Glass beads-Zeosphere | 2.5-4.5 | inorganic |
| Calcium aluminate cement | 12.5-14.5 | inorganic |

One preferred commercially formulation of such a flame retardant is Eco-Additive 20 (available from Avtec Industries), a combination of TWSB® and crystalline graphite.

When fire retardants are present, the coating compositions, before drying, typically comprise about 5% to about 50% flame retardant, preferably about 10% to about 40% flame retardant, more preferably about 20% to about 30% flame retardant.

While it was a discovery of this invention that the above-described emulsions, when compounded with a flame retardant, provide suitable fire-resistant peelable coatings, the coating compositions may contain a variety of other materials such as cosolvents and coalescers, antioxidants, antiozonates, UV stabilizers, colorants, defoamers, corrosion inhibitors, and the like.

In one embodiment, the coating compositions can be compounded with a pigment. The pigment is largely used for coloration. However, without being bound to a particular theory, it is believed that the pigment may also contribute to long term chemical stability of the composition through ultraviolet-blocking. In addition, the pigment can contribute to mechanical strength and stability of the composition (when dried as a film) by acting as a filler. Finally, it is believed that the pigment can help to decrease the water sensitivity of the composition.

In various embodiments the pigment is a finely divided material that contributes to optical and other properties of the coating. The pigment is typically insoluble in the coating medium (e.g., the aqueous dispersion) and is typically mechanically mixed with the coating and deposited when the coating dries. The physical properties of the pigment are typically not changed by incorporation in and deposition from the coating. Preferred pigments include, but are not limited to, inorganic "white" pigments although colored and certain organic pigments are also suitable. Inorganic white pigments suitable for this invention include, but are not limited to, titanium dioxide, white lead, zinc oxide, lithopone (a mixture of zinc sulfide and barium sulfate), zinc sulfide and antimony oxide. Titanium dioxide (e.g., TI-PURE™ R-902, DuPont Chemicals, Wilmington, Del., USA) is particularly suitable for the present invention because high efficiency (unit opacity/weight). The pigment may be present at about 1% to about 20%, more preferably about 1% or 2% to about 8% or 10% and most preferably about 4% to about 6% (e.g., about 4.5%) by weight, of the composition.

In various embodiments the composition can optionally include a "neutralizer" or a "pH adjuster" to adjust the pH of the composition. Means of adjusting pH are well known to those of skill in the art. Particularly where a polymer emulsion is present it is desirable to add a base to neutralize the emulsion. This may be accomplished by the addition of one of a number of water soluble bases well known to those of skill in the art. These include, but are not limited to sodium hydroxide, sodium bicarbonate, calcium carbonate, and amine bases such as pyridine and ethylamine and ammonia. In certain preferred embodiments, the neutralizer comprises NaOH and/or calcium carbonate and the composition is adjusted to a neutral pH.

Certain embodiments, particularly sprayable formulations, can optionally comprise a defoamer. Compatible defoamers are well known to those of skill in the art. One particularly preferred defoamer is Henkle Foamaster FM-O. The defoamer when present, ranges from about 0.1% to about 5%, preferably about 0.2% to about 3%, more preferably about 0.3% to about 2%, and most preferably about 0.4% to about 1% of the coating composition before drying.

In certain embodiments, the coatings preferably include a biocide or preservative to improve shelf life and to help prevent degradation of the wet composition and/or the protective film formed therefrom. Compatible biocides are well known to those of skill in the art. One particularly preferred biocide is Kathon LX 14 (a/r). The biocide, when present is typically at a concentration sufficient to reduce or eliminate bacterial, algal, fungal, or other biological growth or degradation produced by microorganisms. Preferred biocide concentrations, when present, are less than about 5%, preferably less than about 3%, more preferably less than about 1%, and most preferably less than about 0.1%.

In certain embodiments the coatings described herein can further include one or more release agents to facilitate peeling from certain surfaces. Suitable releasing agents include, but are not limited to, natural and synthetic waxes, wax emulsions (e.g., #110 available from Michelman, Cincinnati, Ohio, USA), lecithin, various silocone surfactants, and surfactants with a hydrophile-lipophile balance (HLB) ranging from about 8 to about 10.

In various embodiments the coating compositions of this invention comprise the formulations shown in Table 2 and Table 3.

TABLE 2

Certain illustrative formulations.

| Ingredient | Percent Solids | Wet Composition Low | Wet Composition High |
|---|---|---|---|
| Polyvinyl Butyral Film Former (e.g., BUTVAR ® Aqueous Dispersion RP1) (e.g., BUTVAR ® Aqueous Dispersion 261) (e.g., BUTVAR ® Aqueous Dispersion 3120) (e.g., BUTVAR ® Aqueous Dispersion RP1) (e.g., BUTVAR ® Aqueous Dispersion BR) | 50% | 10% | 90% |
| Extender (e.g., Calcium carbonate) | 100 | 0 | 70% |
| Plasticizer | variable | 0 | 30% |
| Thickener (e.g.. Rohm & Haas Acrysol 825) | 30 | 0 | 25% |
| Dye/Colorant e.g., Titanium dioxide | 100% | 0% | 5% |
| Pigment | 100% | 0% | 2% or 5% |
| Surfactant | 0 | 0 | 3% |
| Biocide (Rohm and Hass Kathon LX 14 (a/r)) | | 0 | 25 ppm |

One preferred formulation is illustrated in Table

TABLE 3

Illustrative formulation of butyral peelable coating composition.

| Ingredient | percent solids | percentage wet composition |
|---|---|---|
| Solutia, Butvar Aqueous Dispersion RPI | 50.00 | 50.0000% |
| Calcium Carbonate | 100.00 | 25.0000% |
| Sun Chemical, Blue Pigment—BHD 6000 | 100.00 | 0.1500% |
| Dupont, Titanium Dioxide | 100.00 | 4.0000% |
| Stepan, Steol CA 460 | 60.00 | 0.2500% |
| Rohm and Haas, Acrysol RM 825 | 25.00 | 1.5000% |
| Rohm and Haas, Kathon LX | | 20 ppm active |
| DI Water | 0.00 | 19.1000% |

These formulations are intended to be illustrative and not limiting. Using the teachings provided herein, other suitable formulations will be available to one of skill in the art.

Typically, compounding the formulations of the present invention requires only simple admixing the components (or aqueous solutions, dispersions, etc. thereof) at substantially atmospheric pressure so as to form a homogeneous mixture or suspension.

The coating compositions of the present invention, while applied as a liquid, will form a substantially continuous solid sheet when dried. Drying can be accomplished at room temperature (i.e. by air drying). However, dry time can be reduced using heat (e.g., using infra red heat lamps, hot air blowers, oven baking, or other heat sources).

As indicated above, it was a surprising discovery of this invention that polyvinyl butyral resin based films even when comprising substantial quantities of essentially inert extender material(s) as described herein, can be used as protective (peel-off) coatings of that can be peeled a wide variety of surfaces coatings once cured. A "peelable" or "peel-off" coating is one that can be removed from the surface it coats simply by mechanical peeling. A peel-off coating preferably possesses sufficient flexibility, toughness, tensile and tear strength so that it does not fracture during peeling. The required flexibility, tensile and tear strength is a function of the strength of adhesion of the coating to the underlying surface. In a certain preferred embodiments, the adhesive ability of the film is sufficient to keep it completely bound to the underlying substrate throughout the period of protection and yet remain fully peelable at the time of removal. It is particularly preferred that the peel-off coating peel without substantial difficulty and/or without being torn in pieces. The coating when peeled preferably does not remain partially unpeeled, leaving portions adhering to the substrate unless it is deliberately only partially lifted from the underlying surface.

The protective coating compositions used in the practice of the methods of his invention can be peeled off a wide variety of surfaces. These include, but are not limited to, metal, glass, plastic, painted wood, marble, laminate, plated surfaces, acrylic, polylcarbonate, a wide variety of plastics previously found to have somewhat unpredicatable release characteristics, and the like. In various embodiments the coating compositions are used to temporarily or permanently protect any of a variety of substrates including, but not limited to vehicles and vehicle components including automotive paints, metals, plastics, glass, asphalt, concrete, porcelain, and ceramics, oil and gas rigs, windmills, gas lines, pipes, ships, boats, aircraft cowlings, aircraft, trucks, buses, construction and farm equipment, and the like.

In various embodiments method of protecting surfaces are provided where a coating composition as described herein is applied to the surface to be protected. Although not required, the composition is typically deposited in a manner that produces a substantially continuous film over the area(s) to be protected. The coating composition can be applied by one of a variety of techniques including, but not limited to, application by brush, roller, spray, dipping, spreading (e.g using a doctor bar), etc. Certain preferred techniques include roller application, brushing, and spraying of the surface with the coating composition. In some cases, additional water may be added for easier application, such as a 2%, 5%, or 10% dilution. Thereafter, the coating composition may be applied with a pressure pot sprayer, preferably first in a thin mist and, thereafter, in a flow coat or thicker substantially continuous film. The coating composition can be sprayed primarily on the surface to be protected, although overspray will not pose significant problems since any overspray may be readily removed with, for example, a wet towel or sponge prior to drying/curing, or after curing by simply peeling the coating off the oversprayed surfaces.

In various embodiments the resulting protective film formed by the coating composition ranges from about 0.01 or about 0.05 or about 0.1 to about 20 or about 30 or about 50 mils thick, preferably about 0.5 to about 20 mils thick, more preferably from about 1 to about 15 mils thick, with a most preferred thickness of about 5 to about 10 mils. Of course the thickness will vary depending on the requirements of the user. Thus, for example, where cost is a concern, thin coatings (~0.1 to 1 mil) are used. Conversely, where impact resistance is desired the coatings may have a thickness in excess of 30 mils.

In certain embodiments, the coating composition is applied in an aerosol form to a surface. In such embodiments, the composition can be stored in a container pressurized with any of a number of propellants including such environmentally benign materials as dimethyl ether, nitrogen, or carbon dioxide. Alternatively, the composition can be stored in a pump-type spray can.

After application to a surface, the coating composition is permitted to dry. As explained above, the coating can be air dried or force dried by any of a number of methods well known to those of skill in the art.

Figure 1:
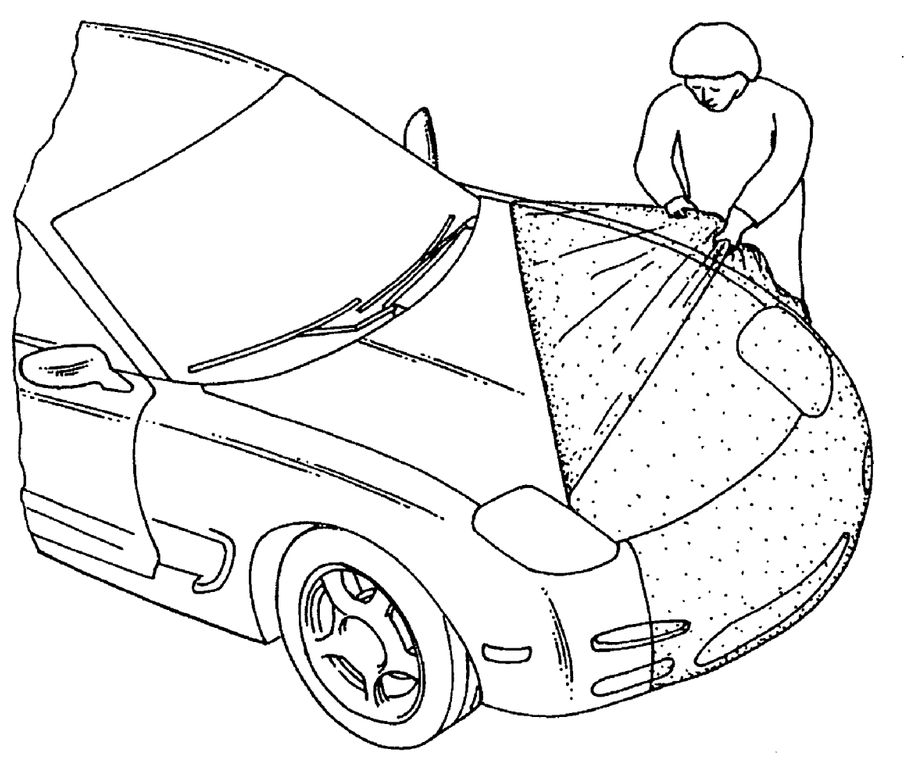
FIG. 1 illustrates removal of the protective coating from the surface of an automobile by peeling.

One of skill in the art will recognize that, in certain embodiments, the coatings of this invention can be utilized as part of a method of transporting vehicles or other objects of manufacture that protects the coated surface of the vehicle or article from scratches, dirt, or other marring. Generally, any of the above-described surface protective coating compositions is applied to the surface to be protected, the vehicle or article is transported, and the protective coating is then removed from the surfaces, e.g., by simple mechanical peeling, e.g., as illustrated in FIG. 1. In certain embodiments peeling can be accomplished using, for example a water blast (power wash), air blast, steam blast, and the like. For example, cars to be loaded onto auto-carriers (either road or rail) are first cleaned of surface debris and dust and then coated with the surface protective coating compositions of the invention as described above. The cars are then transported to their destination where the surface protective coating is removed by peeling. Peeling can typically be accomplished by hand, powerwash, air or steam blast, or with the aid of mechanical devices.

In various embodiments, the coatings of the present invention can be applied to protect sensitive finishes on most any item exposed to deleterious environmental factors. For example, the composition of this invention can be used to coat glass and chrome products being transported or otherwise held or stored, building materials such as formica and bathroom fixtures, composite materials (e.g., fiberglass, Kevlar, PURGO®, WILSONART®, and the like), certain plastic materials, ships and boats (e.g., ships and boats being stored outdoors, particularly during winter), chrome tanks (e.g., on tank trucks), and vehicles generally (e.g., cars, trucks, buses, construction machinery, etc.), oil and gas rigs, windmills, gas lines, aircraft, and the like. In addition, electronic equipment surfaces, e.g surfaces of computers, computer monitors, displays, audio equipment, communications equipment (e.g., cell phones, etc.), personal digital assistants (PDAs) (e.g., PALM®, TREO®, etc.) and the like can be protected during or after manufacture, e.g., during assembly, storage, use, and/or shipment. Further, vehicle windshields, painted finishes and other surfaces can be protected against accumulations of insects and other bugs, dirt, mud, oil, and the like in environments where they are a problem. It has also been found that coatings prepared according to the present invention can be used to protect against graffiti. The paint from graffiti is simply peeled off with the protective coating.

A particularly useful application of the present invention is to protect wheels and tires of vehicles during normal use. In these embodiments, the coating composition is applied to the wheel and/or tire in the manner described above. Typically, a black layer of brake dust accumulates on wheels during normal operation. Because the wheels and tires are coated with the removable coating composition of this invention, the brake dust (and other accumulated dirt) is easily removed by peeling off the coating. The resulting clean wheel and tire can be re-coated with another layer of the coating composition.

Any of the coating compositions of this invention can also be used as a sacrificed layer to protect various items that are not necessarily associated with transportation. For example, various building fixtures found in bathrooms and most other rooms can be protected. Bathtubs, shower stalls, bathroom tiles and floors, etc. are all adversely affected by steam, mineral deposits from water, and soap scum. Much labor is expended by homeowners or maintenance personnel to remove bathroom deposits. The removable coating compositions of this invention are used to temporarily protect bathroom fixtures during normal use. When it is time to clean the bathroom, the coating is simply peeled from the underlying surfaces thereby removing the coating composition together with the accumulated dirt. Similarly, vehicle fenders and bumpers can be coated with the protective films described herein to offer protection from bumps, nicks, scratches, marring, and dirt.

The coatings of this invention are tough, relatively thick, and provide a high degree of resistance to mechanical abrasion. They are therefore particularly suitable for protecting component parts during installation, transportation, and storage. Thus, for example, in bathroom components such as bathtubs, toilets, sinks and shower units are often damaged by contact with abrasives during installation. Workers often stand in or on these items and scratch their surfaces. Such damage is especially common when there is dirt or gravel in the tub and a worker standing in the tub, on top of the gravel grinds the gravel into the tub's surface with his feet. Additionally, because these items are typically left outside on the job site, the coatings' water resistant feature becomes very important.

Similarly the coatings can be used to protect components in automotive assembly plants, or to protect automotive components in repair shops or body shops.

Other fixtures that can be protected by this invention include, but are not limited to banisters, electrical light switch plates, door knobs, windows, etc. Particularly preferred surfaces for coating include metals such as brass or chrome, ceramic, glass, various plastics, composites, and laminates such as FORMICA®.

Similarly the coatings of this invention can protect component parts during assembly in an industrial setting. Thus, for example, component plastic bumpers may be coated to protect against scratching and other damage from the time they are produced, through the car assembly process, and until the car arrives at the dealership. The coatings may provide a rough easily gripped surface and therefore utilized to facilitate the gripping and manipulation of highly machined components without component scratching or other damage.

The coatings can also be used to maintain clean component parts until the time of use. Thus the coatings may be utilized to allow easy removal of accumulated layers of oil and grit, often present in factory environments, from metallic components awaiting assembly. The coating may be quickly peeled from the component just before use thereby removing the accumulated contaminating materials.

Because of their toughness, the coatings of this invention are also suitable for coating and protecting floor surfaces in highly trafficked areas. The compositions may be compounded with various particulate materials to enhance traction.

In addition, because of their stability to high temperatures for prolonged periods of time, the coatings of this invention are suitable for use as peelable paint-booth coatings.

Furniture and other household items can also be protected by the methods of this invention. For example, wood, plastic or metal yard and lawn furniture can be protected by the coating compositions of this invention. In certain embodiments, an ultra-violet radiation blocker is added to the coating composition to protect outdoor furniture from the effects of sunlight. Automobile upholstery (e.g dashboards, etc.) can also be protected by the methods of this invention. It should be noted that the coating composition also protects surfaces from the deleterious effects of ozone, the ubiquitous pollutant formed in smog. It is known that ozone attacks rubbers and other elastomers, causing them to crack. By applying the coating compositions of this invention, cracking associated with ozone is reduced.

One of skill will appreciate that the protective coating need not be removed immediately from the article that it protects. To the contrary, the coating provides an effective protectant during periods of prolonged storage. Thus, in another embodiment, this invention provides for a composition comprising an article of manufacture having a surface coated with a protective coating composition. The article of manufacture can be virtually any article of manufacture as described above.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A composition for the formation of a peelable protective coating on a surface, said composition comprising a liquid aqueous mixture or solution comprising:
   a polyvinyl butyral film former;
   an extender;
   a zinc oxide;
   a surfactant; and
   a thickener;
wherein said mixture or solution does not include a polyurethane, and wherein the coating formed by drying said composition on a surface is removable by mechanical peeling.

2. The composition of claim 1, wherein said extender is selected from the group consisting of a silicate, a carbonate, a sulfate, a halide salt, a mineral, a mineral oxide, a clay, talc, a polymer fiber, glass, glass spheres, plastic spheres, and a polyvinyl alcohol.

3. The composition of claim 1, wherein said extender excludes one or more fillers selected from the group consisting of a silica, a cellulose, a wood flour, and a clay.

4. The composition of claim 1, wherein said extender is selected from the group consisting of barium sulfate, calcium magnesium silicate, mica, calcium carbonate, and diatomaceous earth.

5. The composition of claim 1, wherein said aqueous mixture or solution further comprises a fire/flame retardant.

6. The composition of claim 5, wherein said fire/flame retardant comprises a catalyst/initiator; a carbonific, a cement, a blowing agent, and a heat-resistant inorganic material.

7. The composition of claim 5, wherein said flame retardant comprises a combination of Dipentaerythritol, Melamine, Chlorinated Paraffin, Ammonium polyphosphat, Tris(betachloroethyl)phosphate, Silica flour, Glass beads, and Calcium aluminate cement.

8. The composition of claim 1, wherein said aqueous mixture or solution further comprises a plasticizer.

9. The composition of claim 8, wherein said aqueous mixture or solution further comprises a biocide.

10. The composition of claim 8, wherein said plasticizer comprises about 10% or less of said aqueous mixture or solution.

11. The composition of claim 1, wherein said polyvinyl butyral film former percent solids ranges from about 5% to about 50% wt/wt of said aqueous mixture of solution.

12. The composition of claim 1, wherein said surfactant is present at up to about 5% of said aqueous mixture or solution.

13. The composition of claim 12, wherein said surfactant comprises a siloxane.

14. The composition of claim 1, wherein:
   said polyvinyl butyral film former percent solids ranges from about 15% to about 40% wt/wt of said aqueous mixture or solution; and
   said extender comprises from about 15% to about 30% of said aqueous mixture or solution.

15. The composition of claim 14, wherein said aqueous mixture or solution further comprises a thickener.

16. The composition of claim 15, wherein said aqueous mixture or solution further comprises a surfactant.

17. An article of manufacture comprising a surface coated with a protective coating composition where said coating composition, before drying, comprises a composition of claim 1.

18. A method of protecting a surface, said method comprising:
   i) applying to said surface a liquid coating composition of claim 1; and
   ii) drying said coating composition to form, on said surface, a substantially continuous peelable protective film.

19. The method of claim 18, wherein said applying is by a means selected from the group consisting of a sprayer, a brush, a roller, dipping, extruding, and a doctor bar.

20. The method of claim 18, wherein said applying comprises air drying said composition at room temperature.

21. The method of claim 18, wherein said method further comprises removing said composition from said surface.

22. The method of claim 21, wherein said removing comprises peeling said composition from said surface.

23. The method of claim 21, wherein said removing comprises a method selected from the group consisting of a powerwash, an airblast, and a steamblast.

24. The method of claim 18, wherein said surface is a surface of an article of manufacture selected from the group consisting of a motor vehicle, a motor vehicle component, a bathroom fixture, a plumbing fixture, a tool, a machine, a laminated countertop, a table top, a window assembly, a door assembly, a stove, a refrigerator, a microwave oven, an aluminum tank, a wheel, furniture, a plated or chromed part, a bumper, an instrument panel, a part of an oil or gas rig, a surface of an aircraft, a marine vessel, a surface of a train, a furniture surface, a musical instrument, a pipe, a paintbooth surface, a part of a windmill, a shelf, a composite, a floor, a cargo container, electronic equipment casing, a surface of a bridge, construction equipment, and a cabinet.

* * * * *

UNITED STATES PATENT AND TRADEMARK OFFICE
Certificate

Patent No. 8,263,231 B2　　　　　　　　　　　　　　　　　　　Patented: September 11, 2012

On petition requesting issuance of a certificate for correction of inventorship pursuant to 35 U.S.C. 256, it has been found that the above identified patent, through error and without any deceptive intent, improperly sets forth the inventorship.
    Accordingly, it is hereby certified that the correct inventorship of this patent is: Robert Mesa, Santa Clara, CA (US); and Sadreddin Hosseini, Ballwin, MO (US).

Signed and Sealed this First Day of October 2013.

*CALLIE SHOSHO*
*Supervisory Patent Examiner*
*Art Unit 1787*
*Technology Center 1700*